July 4, 1933.　　　　F. B. PASTIR　　　　1,916,527

INFLATABLE TOY BALLOON WITH OPENINGS

Filed April 8, 1932

INVENTOR
FRANK B. PASTIR
BY
ATTORNEY

Patented July 4, 1933

1,916,527

UNITED STATES PATENT OFFICE

FRANK B. PASTIR, OF NEW YORK, N. Y.

INFLATABLE TOY BALLOON WITH OPENINGS

Application filed April 8, 1932. Serial No. 603,913.

This invention relates to new and useful improvements in balloons and more particularly relates to inflatable toy balloons with openings.

The invention has for an object the construction of an inflatable balloon which is characterized by material in the shape of a balloon and having a transverse opening or openings.

As a further object it is proposed to arrange the openings one above the other or alongside each other.

The invention still further proposes to arrange the openings in the balloon in a manner so as to form tubular sides.

Furthermore, the invention has for an object the construction of an inflatable balloon with transverse openings and means within the balloon for determining the shape of these openings upon inflation.

The invention still further proposes the construction of an article of the class described which is of simple durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Figure 1:
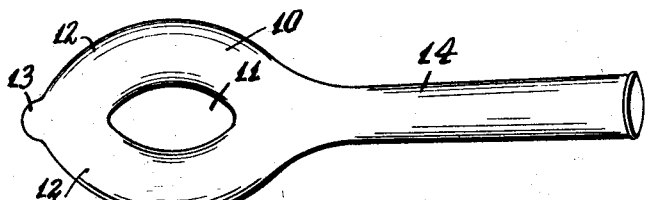
Fig. 1 is a side elevational view of a balloon constructed according to this invention.

According to this invention, the inflatable balloon with openings, comprises material 10 in the shape of an inflatable balloon and having a transverse opening 11. The opening 11 extends longitudinally along the length of the balloon so as to form tubular sides 12. One end 13 of the balloon is closed while the other end 14 is provided with a neck for its inflation.

Figure 2:
Fig. 2 is a side elevational view of another balloon constructed according to this invention.

In Fig. 2 a modified form of the invention has been disclosed in which a pair of openings 11' have been shown within the balloon and these openings arranged one above the other. In other respects this form is similar to the previous form.

Figure 3:
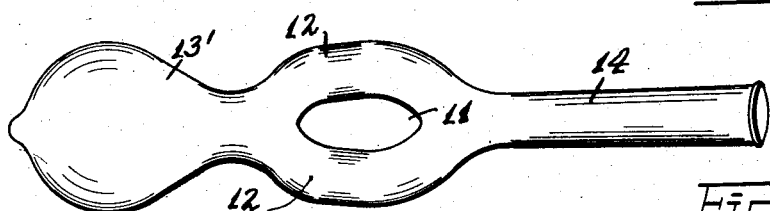
Fig. 3 is a side elevational view of another balloon constructed according to this invention.

In Fig. 3 another variation of the invention has been disclosed in which the end 13' is enlarged and in the form of a protuberance from the balloon. In other respects this balloon is identical to the one illustrated in Fig. 1.

Figure 4:
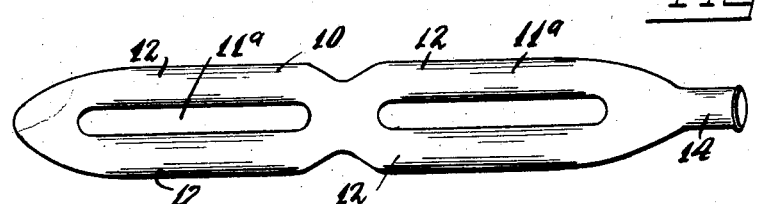
Fig. 4 is a side elevational view of another balloon constructed according to this invention.
Figure 7:
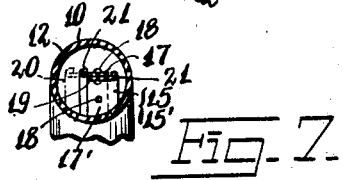
Fig. 7 is a transverse sectional view taken on the line 7—7 of Fig. 6.

In Fig. 4 another variation of the invention has been disclosed in which openings 11ª are formed in the balloon longitudinally and in end aligned relation.

Figure 5:
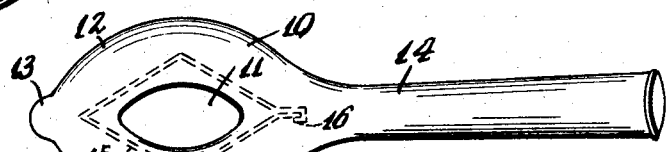
Fig. 5 is a side elevational view of another balloon constructed according to this invention.

Fig. 5 discloses another form of the invention which distinguishes from Fig. 1 in the provision of means located within the toy balloon for determining the shape which the opening 11 assumes when the balloon is inflated. More particularly, this means comprises a frame 15 engaged within the balloon around the opening 11 and held in place by the ends 16 of the frame engaging each other. The frame is shown of diamond shape so as to cause the toy balloon opening to assume this shape when inflated.

Figure 6:
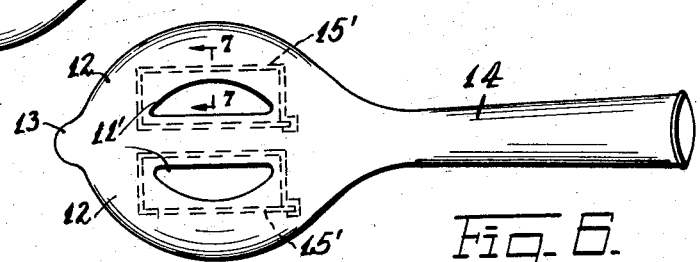
Fig. 6 is a sectional view of another balloon constructed according to this invention.

In Fig. 6 another variation of the invention has been disclosed in which frames 15' are shown which differ from the frame 15 merely in shape. These frames are of rectangular shape so as to cause the openings 11' to assume rectangular form when inflated.

Each of the frames 15, 15' are composed from adjacent frame sections 17 and 17' frictionally held in slidable relation by rivets 18 passing through elongated openings 19 in these sections. The sections are arranged one upon the other so that they may be moved to extended positions as indicated by the dot dash line 20 to change the width of the frames and thus change the effect produced when the balloon is inflated. Particular attention is called to the arrangement of turned ends 21 upon the outer edges of the sections so that the sections may be moved through the material of the balloon.

It is to be understood that the toy balloon and the forming frame 15 may be of any desired shape and cross section.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An inflatable balloon with openings, comprising material in the shape of an inflatable balloon having a transverse opening, and means for forcing the opening to assume a shape other than its natural shape when the balloon is inflated.

2. An inflatable balloon with openings, comprising material in the shape of an inflatable balloon having a transverse opening, and means for limiting the shape which the opening takes when the balloon is inflated, said means being located within the balloon.

3. An inflatable balloon with openings, comprising material in the shape of an inflatable balloon having a transverse opening, and means for limiting the shape which the opening takes when the balloon is inflated, said means being located within the balloon, and comprising a frame of a specific shape and adjustable in width for varying the shape which the opening assumes.

4. An inflatable balloon with openings, comprising material in the shape of an inflatable balloon having a transverse opening, and means for limiting the shape which the opening takes when the balloon is inflated, said means being located within the balloon, and comprising a frame of a specific shape and adjustable in width for varying the shape which the opening assumes, comprising two sections constituting the frame, and means for slidably connecting the sections to each other.

5. An inflatable balloon with openings, comprising material in the shape of an inflatable balloon having a transverse opening, and means for limiting the shape which the opening takes when the balloon is inflated, said means being located within the balloon, and comprising a frame of a specific shape and adjustable in width for varying the shape which the opening assumes, comprising two sections constituting the frame, and means for slidably connecting the sections to each other, comprising slots formed in one of the sections, similar slots formed in the other section, and means engaging in the slots of both sections.

6. An inflatable balloon with openings, comprising material in the shape of an inflatable balloon having a transverse opening, and means for limiting the shape which the opening takes when the balloon is inflated, said means being located within the balloon, and comprising a frame of a specific shape and adjustable in width for varying the shape which the opening assumes, comprising two sections constituting the frame, and means for slidably connecting the sections to each other, comprising slots formed in one of the sections, similar slots formed in the other section, and means engaging in the slots of both sections, comprising rivets.

In testimony whereof I have affixed my signature.

FRANK B. PASTIR.